Sept. 11, 1928.  
E. ROBERTS  
BRAKE FOR GYRATORY CENTRIFUGALS  
Filed April 6, 1923
1,684,368
2 Sheets-Sheet 2
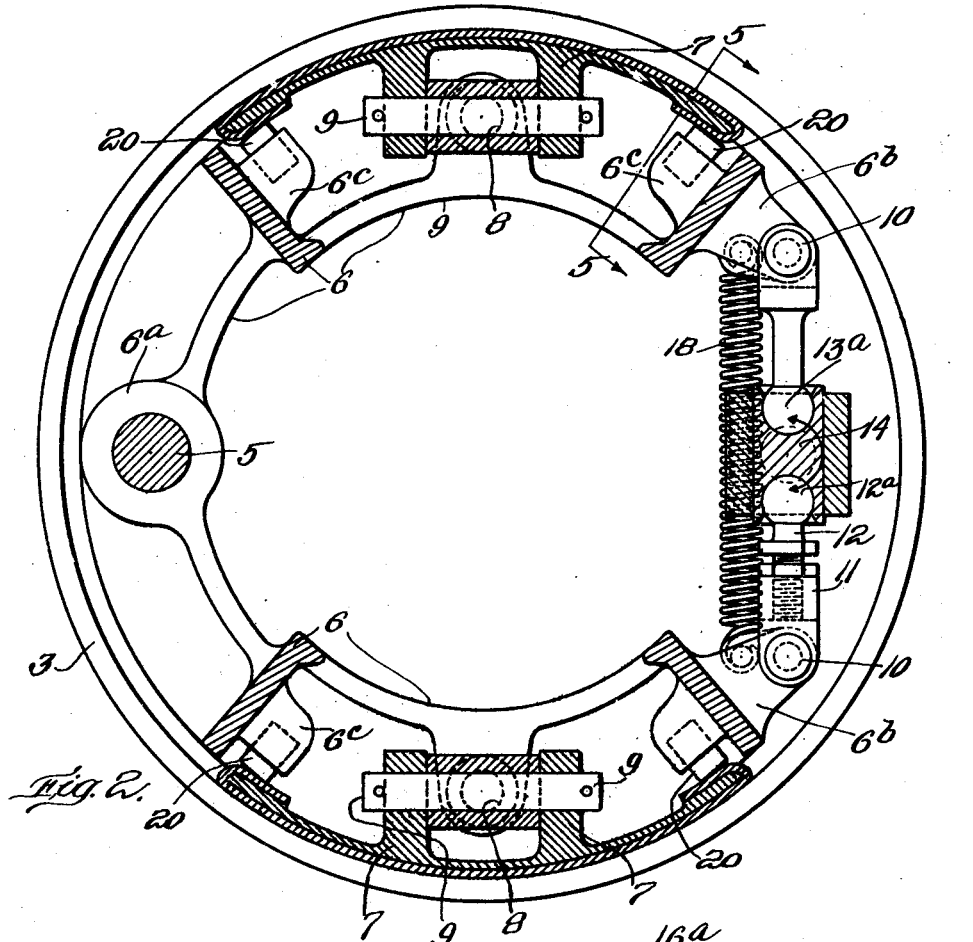
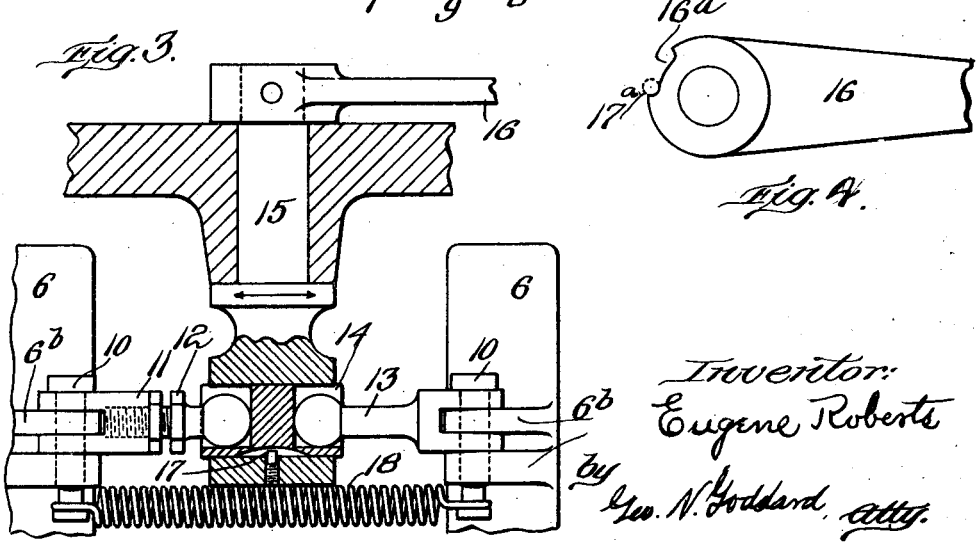
Inventor:
Eugene Roberts
by Geo. N. Goddard, atty.

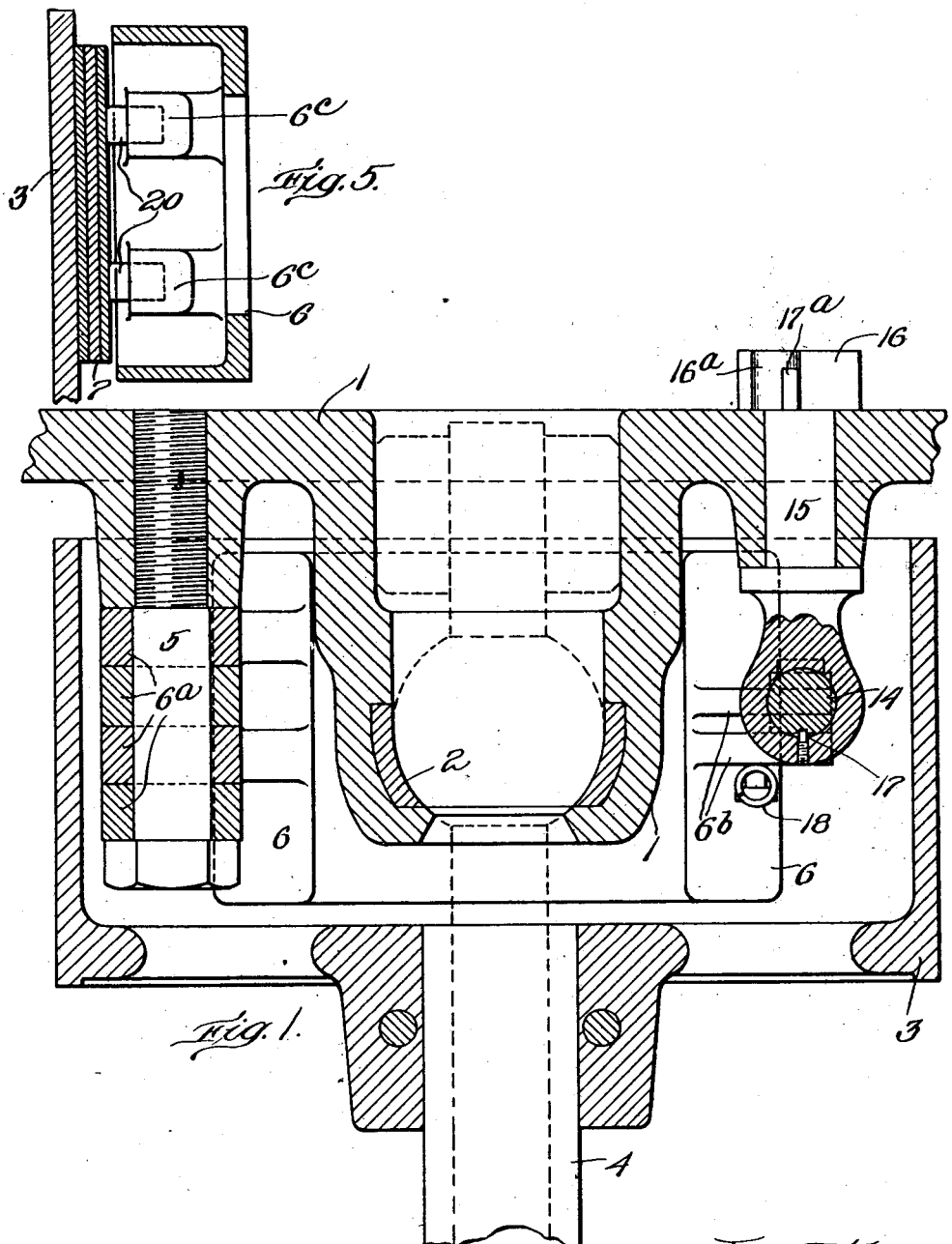

Patented Sept. 11, 1928.

1,684,368

UNITED STATES PATENT OFFICE.

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH.

BRAKE FOR GYRATORY CENTRIFUGALS.

Application filed April 6, 1923. Serial No. 630,239.

This invention relates to a brake construction for centrifugal machines which is intended to provide a simple and efficient construction and arrangement for the purpose of obviating certain difficulties experienced in the use of brakes of existing types for this purpose.

Heretofore it has been common practice to employ for centrifugal machine service in sugar mills and other places where heavy loads were carried at high speeds in centrifugal baskets, a brake pulley fast on the gyratory basket shaft with interiorly disposed brake shoes arranged to be expanded by a toggle couple connected with a vertically movable actuating rod which was forced down under strong leverage to straighten the toggle and expand the arcuate brake shoes against the inside of the pulley, after the manner disclosed in U. S. Patent No. 500,611 dated July 4, 1893.

The construction shown in said patent, while long used in the art, is open to serious objections. The powerful downward thrust of the toggle-expanding or actuating rod exerts a heavy lateral strain against the fulcral spindle that supports the brake shoes so that it becomes bent from its correct vertical line, thus throwing the brake shoes out of proper relation to the pulley with resulting impairment of brake efficiency due to non-alinement of the friction pads with the interior surface of the brake pulley, and also involving injury and excessive wear on the brake shoe besides causing unbalanced strains and pounding of the spherical bearing which supports the centrifugal for gyration.

The present invention overcomes these difficulties by providing a construction and arrangement of brake applicable to the gyrating pulley by which the brake-supporting spindle is relieved of such bending or distorting strains and the brake shoes are vertically supported at their free ends by the toggle-expanding member. Not only are the brake shoe arms always maintained in the same horizontal plane, but the shoes or brake pads are so mounted as to accommodate themselves perfectly to the gyratory or tilting movements of the brake pulley secured to the gyratory shaft.

The features of construction and arrangement by which these and other advantages are obtained will be particularly described in the following specification and will be defined in the claims hereto annexed.

In the accompanying drawings:

Figure 1 shows a vertical central section of the brake mechanism in connection with the directly related parts of the centrifugal.

Figure 2 is a plan view in horizontal section on the medial plane of the brake.

Figure 3 is a front elevation, partly in section, showing the engagement of the toggle links with the toggle-expanding or thrust member.

Figure 4 is a detail view in plan showing the construction of the brake-actuating lever.

Figure 5 is a detail of the brake arm and pad in cross section.

In Figure 1 of the drawings I have shown the usual socket hanger 1, in which is set spherically curved babbitt lining 2 for supporting the spherical bearing ball secured to the upper end of the spindle with provision for the usual annular buffer between the upper end of the spindle and the surrounding portion of the hanger, all shown in dotted lines since the construction is common and well known for belt driven machines of this type.

The hollow quill or rotary basket-carrying shaft 4, has secured to its upper end the pulley 3, whose interior face forms one element of the brake.

A depending vertical post 5, forms a fulcral spindle for pivotally supporting the opposed brake arms 6, which are provided with perforated ears 6$^a$, arranged in pairs to fit around the post 5, to permit the brake arms to swing in a horizontal plane.

Each brake arm is provided with a recess or box in which is pivotally mounted the brake shoes or pads 7, which instead of being rigidly secured to the brake arms, are connected therewith by a universal joint so as to have movement about a vertical axis 8, and a horizontal axis 9, in order that the brake pads may accommodate themselves to all gyratory movements of the pulley and present their full friction faces in contact with the interior of the pulley in its every position of oscillation.

The brake arms 6, are provided at their forward or free ends with perforated lugs or ears 6$^b$, adapted to receive vertical pivot pins 10, for supporting the toggle members or links to permit them to swing with relation to the brake arms in a horizontal plane.

The toggle members 11 and 13 are provided with similar perforated ears adapted to register with the ears 6ᵇ, so that the toggles will be supported in horizontal position and in opposition to each other. One of the toggles 13, may be made in one piece, while the other toggle is preferably made in two parts, namely, an internally screw threaded part 11, and an externally screw threaded part 12, adapted to have threaded connection therewith to provide for lengthening or shortening the toggle to effect suitable operative adjustment.

Both toggle members are provided at their adjacent ends with ball ends adapted to fit in spherical sockets formed in an interposed thrust member 14, which is slidingly mounted in the transverse bore of the lower end of the block shaft 15, and is prevented from rotation therein by means of a splined connection shown at 17.

The brake shoes are normally drawn together by contractile spring 18, yieldingly connecting their free ends. The upper end of the rock-shaft or toggle-actuating member 15, is secured to an actuating lever 16, whose hub is cut away at 16ᵃ, so as to permit a limited oscillation or movement of the lever and rock-shaft into and out of brake-expanding position. The pin 17ᵃ, secured to the top of the hanger 1, engages the shoulders of said recess to form a stop limiting the arc of movement of said lever and rock-shaft.

As the toggle links are pivotally supported on vertical pivot pins they are normally held in alinement with each other and with the interposed thrust member 14. The hub actuating lever 16, supports the weight or downward thrust of the toggle-expanding member 15, and as the ball ends of the toggles have their free ends supported against dropping by their actuating member it will be seen that both ends of the brake arms are supported against any downward thrust whatever both when the brake is idle and when it is in active service.

If the brake arm is swung so as to flex the toggles, the spring tends to keep them in flexed position with the brake pads entirely out of contact with the pulley. The positive interlocking engagement between the ball 12ᵃ and 13ᵃ, and the intermediate thrust member 14, absolutely assures the retraction of the brake pads from contact with the pulley. With the previous construction it was possible for the brake to adhere to the brake pulley in spite of the contractile spring and thus caused trouble, while in the present case the sockets extend more than half way around each toggle ball so that throwing the brake lever, of necessity, positively retracts both brake pads from pulley contact.

It will also be seen that as the whole thrust in expanding the brake is in a horizontal plane, the twisting or bending action incidental to the exerting of a downward thrust on the brake arms is wholly avoided, and the fulcral spindle will remain in correct vertical position to secure at all times perfect alinement of the brake levers and pads with the pulley, while the universal joint support of each pad allows it to accommodate itself to the yielding movements of the pulley due to the gyration of the basket shaft.

The brake pads or shoes 7 are kept in normal position with their outer friction faces in substantial parallelism with the inner face of the brake pulley by means of interposed yielding buffers 20 carried by socket members 6ᶜ on the brake arms 6. The brake shoes or pads 7 are covered with suitable brake lining material 7ᵃ.

What I claim is:

1. In a brake for gyratory centrifugals, the combination of a brake pulley secured to the gyratory basket shaft and oscillating therewith, a pair of brake arms pivotally mounted interiorly of said pulley, the fulcrumed ends and the free ends of said brake arms being supported against downward movement, and means for expanding said brake arms by horizontal thrust into engagement with the surrounding pulley, substantially as described.

2. In a brake for gyratory centrifugals, the combination of a brake pulley secured to and oscillating with a vertical gyratory basket shaft, a pair of brake arms fulcrumed on a vertical axis to swing in a horizontal plane outwardly against the interior face of said pulley, a toggle mechanism engaged with the free ends of said arms to support them against downward thrust or movement, and means for expanding said toggle mechanism in a horizontal direction without downward thrust upon the free ends of the brake arms, whereby the brake arms are moved into operative braking relation to the pulley, substantially as described.

3. In a brake for gyratory centrifugals, the combination with a brake pulley secured to and oscillating with a vertical gyratory basket-shaft, a pair of internally disposed brake arms fulcrumed on a vertical supporting post to swing in a horizontal plane outwardly against the interior face of said pulley, a pair of opposed toggle elements pivotally connected to the free ends of said brake arms by a joint permitting movement in a horizontal plane only, a toggle-supporting and expanding member mounted in a fixed bearing to permit oscillation about a vertical axis, while being supported against axial movement in either direction, said expanding member being provided with vertically bored recesses providing interlocking pivotal joints with adjacent ends of the said toggle elements and affording, at the same time, a support to prevent sagging or dropping of the toggle elements and the free ends of the brake arms to which said elements are jointed as aforesaid.

4. In a brake for gyratory centrifugal, the combination with a surrounding brake pulley secured to the basket-shaft, internal brake shoes fulcrumed to swing in a horizontal plane about a vertical axis, toggle elements pivotally hinged to the free ends of said brake arms to have movement about horizontal axes only, an expanding member comprising a rotatable, vertically immovable expanding shaft provided with a transverse bore in alignment with the adjacent ends of said toggle elements, a thrust member detachably secured in said transverse bore to interpose an expanding portion between ball-like adjacent ends of said toggle elements, said thrust member being provided, at its opposite ends, with dove-tail recesses to interlockingly receive the ball ends of the toggle elements so as to exert alternately a positive thrust and pull to expand and contract the brake arms, substantially as described.

In witness whereof, I have subscribed the above specification.

EUGENE ROBERTS.